Aug. 20, 1940.   L. G. S. BROOKER   2,211,762
MEROCYANINE DYE
Filed April 26, 1937

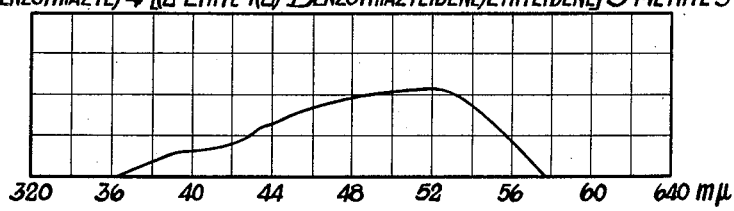

Fig.1. 1-(1-Benzothiazyl)-4-[(2-Ethyl-1(2)-Benzothiazylidene)Ethylidene]-3-Methyl-5-Pyrazolone

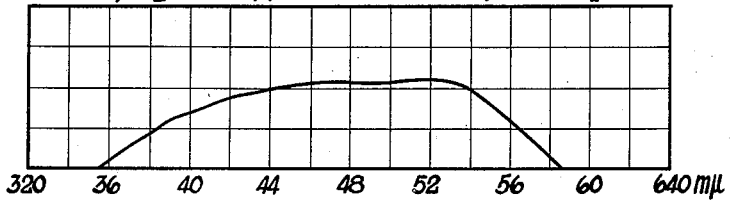

Fig.2. 1-(1-Benzothiazyl)-4-[(2-Ethyl-1(2)-Benzoselenazylidene)Ethylidene]-3-Methyl-5-Pyrazolone

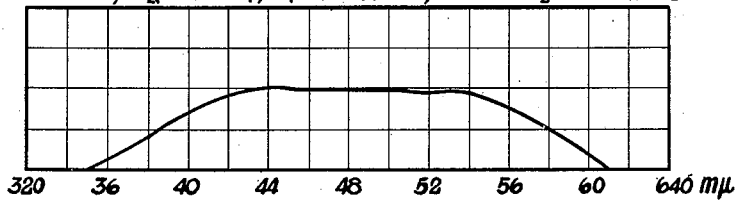

Fig.3. 1-(1-Benzothiazyl)-4-[(1-Ethyl-2(1)-Quinolylidene)Ethylidene]-3-Methyl-5-Pyrazolone

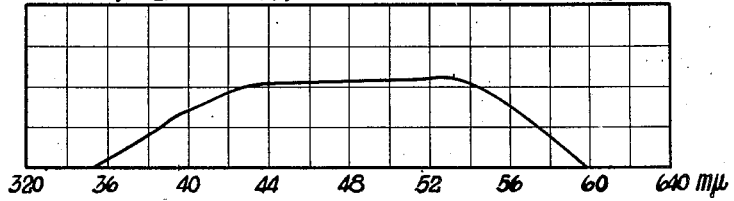

Fig.4. 1-(1-Benzothiazyl)-4-[(2-Ethyl-1(2)-β-Naphthothiazylidene)Ethylidene]-3-Methyl-5-Pyrazolone Leslie G. S. Brooker,
INVENTOR BY N. M. Perrins
Daniel J. Mayne
ATTORNEYS.

Patented Aug. 20, 1940

2,211,762

UNITED STATES PATENT OFFICE 2,211,762

MEROCYANINE DYE

Leslie G. S. Brooker, Rochester, N. Y., assignor to Eastman Kodak Company, Rochester, N. Y., a corporation of New Jersey Application April 26, 1937, Serial No. 138,954

9 Claims. (Cl. 260—240)

This invention relates to dyes and to photographic emulsions containing the same.

This application is a continuation-in-part of my copending application Serial No. 752,036, filed November 8, 1934, which in turn is a continuation-in-part of my copending application Serial No. 739,502, filed August 11, 1934.

An object of my invention is to provide new dyes and a process for the preparation thereof. A further object is to provide photographic emulsions containing such new dyes. A still further object is to provide photographic emulsions sensitized with such new dyes. Other more specific objects will be apparent hereinafter from the specification and claims.

My new dyes can be characterized by the following general formulas:

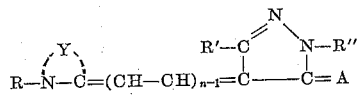

and

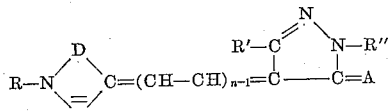

wherein A represents a divalent atom, such as oxygen or sulfur, D represents a vinylene or phenylene group, n represents a positive integer not greater than three, R and R' represent alkyl groups, R'' represents an azyl (also called azolyl) group linked to the nitrogen atom (N) of the pyrazolone nucleus through the azyl group's position adjacent to the azyl nitrogen atom, i. e. the so-called α-position, and selected from the group consisting of α-thiazyl groups (for example, α-(4-methyl)-thiazyl, α-(4-phenyl)-thiazyl, α-benzothiazyl or α-naphthothiazyl), α-selenazyl groups (for example, α-(4-methyl)-selenazyl, α-(4-phenyl)-selenazyl or α-benzoselenazyl) and α-oxazyl groups (for example, α-benzoxazyl) and Y represents the non-metallic atoms necessary to complete a five-membered heterocyclic nucleus, such as a thiazole nucleus, for example 4-methylthiazole, 4-phenylthiazole, benzothiazole or naphthothiazole, an oxazole nucleus, for example 4-methyloxazole, 4-phenyloxazole, benzoxazole or naphthoxazole, a selenazole nucleus, for example 4-methylselenazole, 4-phenylselenazole, benzoselenazole, a thiazoline nucleus, a selenazoline nucleus, a pyridine nucleus, a quinoline nucleus, for example 5-methylquinoline or benzoquinoline or an indolenine nucleus, for example a 3,3-dialkylindolenine nucleus.

Dye of the above formula where n represents one can be prepared by reacting a cyclammonium quaternary salt, such as a thiazole, an oxazole, a selenazole, a thiazoline, a selenazoline, a pyridine, a quinoline or an indolenine quaternary salt, for example, containing a substituted-mercapto group in the alpha or gamma position, i. e. one of the so-called reactive positions, with a pyrazolone of the following formula:

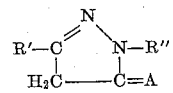

wherein A represents an atom, such as oxygen or sulfur, R' represents an alkyl group and R'' represents an α-thiazyl group, an α-selenazyl group, or an α-oxazyl group.

The following examples serve to illustrate the preparation of dyes wherein n represents one. These examples are not intended to limit my invention.

EXAMPLE 1.—1-(1-benzothiazyl)-4-(2-ethyl-1(2) benzothiazylidene)-3-methyl-5-pyrazolone 1.16 g. (1 mol.) of 1-(1-benzothiazyl)-3-methyl-5-pyrazolone, 1.7 g. (1 mol.) of 1-methylmercaptobenzothiazole ethiodide and 0.53 g. (1.05 mol.) of triethylamine were refluxed in 40 cc. of absolute ethyl alcohol for about 10 minutes. The reaction mixture was chilled to 0° C. and the dye separated. The dye was washed with methyl alcohol, followed by water. After recrystallization from glacial acetic acid, the dye was obtained as fine pale yellow crystals, melting at 286°–288° C. with decomposition. The dye has the following formula:

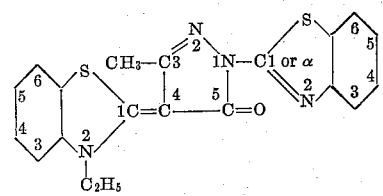

In a manner similar to that illustrated in the above example, other thiazole quaternary salts containing a substituted-mercapto group in a reactive position can be condensed with pyrazolones of the type formulated above. The quaternary salts need not be the alkyl halides, but can be the alkyl sulfates, the alkyl perchlorates, the alkyl p-toluenesulfonates or the like. The substituted-mercapto group need not be the methylmercapto group, but can be other alkylmercapto groups, such as n-butylmercapto, or arylmercapto groups, such as phenylmercapto, naphthylmercapto, pyrazonylmercapto, benzothiazylmercapto or the like. The reactions are advantageously effected in the presence of an acid binding agent. Sodium or potassium hydroxide or carbonates can be used. Strong organic bases, such as triethylamine, N-methylpiperidine, triethanolamine or the like are advantageously employed. Sodium acetate can be used. Heat accelerates the reactions.

Dyes of the above formula where $n$ represents two can be prepared by reacting a cyclammonium quaternary salt, such as a thiazole, a selenazole, an oxazole, a thiazoline, a selenazoline, a pyridine, a quinoline or an indolenine quaternary salt, for example, containing a β-anilinovinyl group in the alpha or gamma position, i. e. one of the so-called reactive positions, with a pyrazolone of the following formula:

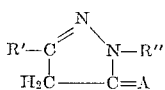

wherein A represents an atom, such as oxygen or sulfur, R' represents an alkyl group and R'' represents an α-thiazyl, and α-selenazyl, or an α-oxazyl group.

The following examples serve to illustrate the preparation of dyes wherein $n$ represents two. These examples are not intended to limit my invention.

EXAMPLE 2.—*1-(1-benzothiazyl)-4-[(2-ethyl-1 (2)-benzoxazylidene) ethylidene]-3-methyl-5-pyrazolone*

1.16 g. (1 mol.) of 1-(1-benzothiazyl)-3-methyl-5-pyrazolone, 2.17 g. (1 mol.) of 1-(β-acetanilidovinyl)-benzoxazole ethiodide and 0.53 g.(1.05 mol.) of triethylamine were refluxed in 50 cc. of absolute ethyl alcohol for about 10 minutes. The reaction mixture was chilled to 0° C. and the dye separated from the reaction mixture. The dye was washed with methyl alcohol, followed by water and finally with methyl alcohol. After recrystallization of the dye from glacial acetic acid, the dye was obtained as orange-yellow crystals, melting at 313°–314° C. with decomposition. The dye has the following formula:

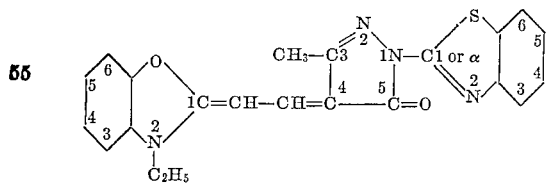

EXAMPLE 3.—*1 - (1-(benzothiazyl) -4-[(2-ethyl-1 (2)-benzothiazylidene) ethylidene]-3-methyl-5-pyrazolone*

1.16 g. (1 mol.) of 1-(1-benzothiazyl)-3-methyl-5-pyrazolone, 2.25 g. (1 mol.) of 1-(β-acetanilidovinyl)-benzothiazole ethiodide and 0.53 g. (1.05 mol.) of triethylamine were refluxed in 25 cc. of absolute ethyl alcohol for about 10 minutes. The reaction mixture was chilled to 0° C. and the dye separated from the reaction mixture. The dye was washed with methyl alcohol, then with water and finally with methyl alcohol. After recrystallization from glacial acetic acid, the dye was obtained as a reddish-orange crystalline powder, melting at 295°–297° C. with decomposition. The dye has the following formula:

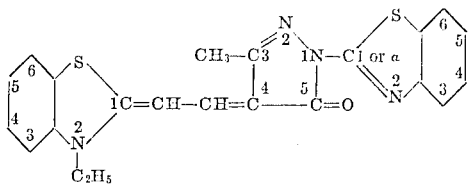

EXAMPLE 4.—*1-(1-benzothiazyl) - 4 - [ (1-ethyl-2 (1)-quinolylidene) ethylidene]-3-methyl-5-pyrazolone*

1.16 g. (1 mol.) of 1-(1-benzothiazyl)-3-methyl-5-pyrazolone, 2.01 g. (1 mol.) of 2-(β-anilinovinyl)-quinoline ethiodide and 0.45 g. (1.05 mols.) of fused sodium acetate were refluxed in 10 cc. of acetic anhydride for about 10 minutes. The reaction mixture was chilled at 0° C. and the dye separated from the reaction mixture. The dye was washed with methyl alcohol, followed by water. After recrystallization from methyl alcohol, the dye was obtained as green crystals, melting at 300°–303° C. with decomposition. The dye has the following formula:

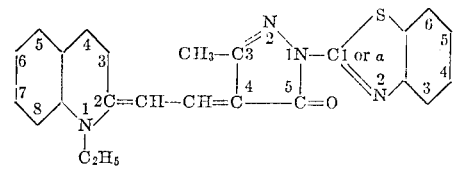

EXAMPLE 5.—*1-(1-benzothiazyl)-4-[2-ethyl-1(2)-benzoselenazylidene) ethylidene]-3-methyl-5-pyrazolone*

0.58 g. (1 mol.) of 1-(1-benzothiazyl)-3-methyl-5-pyrazolone, 1.42 g. (1 mol.) of 1-(β-acetanilidovinyl)-benzoselenazole ethiodide and 0.27 g. (1.05 mols.) of triethylamine were refluxed in 25 cc. of absolute ethyl alcohol for about 10 minutes. The reaction mixture was chilled to 0° C. and the dye separated from the reaction mixture. The dye was washed with methyl alcohol, followed by water. After recrystallization from methyl alcohol, the dye was obtained as minute light red needles, melting at 272°–275° C. with decomposition (slight sintering at 205° C.). The dye has the following formula:

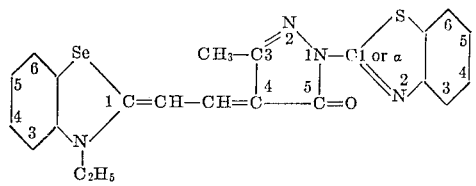

In a manner similar to that illustrated in the above examples, other thiazole, selenazole and oxazole quaternary salts containing a β-anilinovinyl group in a reactive position can be condensed with pyrazolones of the type formulated above. The quaternary salts need not be the alkyl halides, but can be the alkyl sulfates, the alkyl perchlorates, the alkyl-p-toluene-sulfonates or the like. The β-anilinovinyl group is advantageously a β-acetanilidovinyl group or other similar acyl derivatives. The reactions are advantageously effected in the presence of an acid binding (basic condensing) agent. Sodium or potassium hydroxides or carbonates can be employed. Strong organic bases, such as triethylamine, N-methylpiperidine, triethanolamine, diethylamine or the like, i. e. organic bases having a dissociation constant substantially greater than that of pyridine, are advantageously employed. Heat accelerates the reactions.

In all of the above examples, a diluent has been employed. This procedure is advantageous, though not essential. Ethyl alcohol and other lower aliphatic alcohols, i. e alcohols of from one to four carbon atoms, are advantageously employed as diluents. The diluent is advantageously such that the reaction mixture is homogeneous and the dye separates therefrom at least upon cooling or chilling, if necessary. The proportions of the reactants in the above examples are equimolecular. These proportions are generally satisfactory and the amount of condensing agent is advantageously that necessary to bind the element of acid eliminated from the condensing molecules or a small excess.

Dyes of the above general formulas wherein $n$ represents one can also be prepared by condensing pyrazolones of the above formula with cyclammonium quaternary salts containing, in a reactive position, a halogen atom instead of a substituted-mercapto group. 2-iodoquinoline or 2-iodo-$\beta$-naphthoquinoline quaternary salts, especially alkiodides, are particularly suitable.

To prepare my new dyes where $n$ represents three, a cyclammonium quaternary salt containing, in a reactive position, an $\omega$-anilino-$\Delta^{1,3}$-butadienyl group is employed. The butadienyl compound is condensed with a pyrazolone of the above formula advantageously in the presence of a basic condensing agent as in the above examples. A diluent, such as ethyl alcohol or other lower aliphatic alcohol is advantageously employed. Equimolecular proportions of the reactants are suitable and the condensing agent is employed in an amount sufficient to bind the elements of acid eliminated from the condensing molecules. The diluent is advantageously of quantity sufficient to provide a homogeneous reaction mixture, although the quantity of diluent must not preclude satisfactory condensation and isolation of the dye. The dye ordinarily separates from the reaction mixture at least upon cooling, or, if necessary, chilling.

The $\beta$-anilinovinyl compounds employed in preparing dyes where $n$ represents two can be prepared by reacting a cyclammonium quaternary salt containing a reactive alkyl group in a reactive position with diphenylformamidine. The materials are advantageously heated together in a lower aliphatic acid anhydride. The following procedure is illustrative:

48 g. (1 mol.) of diphenylformamidine and 67 g. (1 mol.) of 1-methylbenzothiazole ethiodide were refluxed in about 365 cc. of acetic anhydride for about 20 minutes. The acetylated $\beta$-anilinovinyl compound separated from the chilled reaction mixture. It was washed with acetone and dried.

40 g. (1 mol.) of diphenylformamidine and 58 g. (1 mol.) of 1-methylbenzoxazole ethiodide were refluxed in about 250 cc. of acetic anhydride for about 20 minutes. The acetylated reaction product separated from the chilled reaction mixture. It was washed with acetone and dried.

40 g. (1 mol.) of diphenylformamidine and 60 g. (1 mol.) of quinaldine ethiodide were heated together at about 180° C. for about 10 minutes, with stirring. The cooled reaction product was ground with acetone and dried. 20 g. (1 mol.) of this dried reaction product was refluxed in about 50 cc. of acetic anhydride for about 10 minutes. The acetylated compound separated from the chilled reaction mixture. It was filtered, washed with acetone and dried.

If the acetylated reaction products do not separate readily from the reaction mixtures, they can be precipitated therefrom by adding diethyl ether.

The anilino-$\Delta^{1,3}$-butadienyl compound, employed in preparing my new dyes where $n$ represents three, can be prepared by reacting a cyclammonium quaternary salt containing a reactive alkyl group in a reactive position with a $\beta$-anilinoacrolein anil salt. The materials are advantageously heated together in a lower aliphatic acid anhydride, i. e. one of from four to eight carbon atoms. The following procedure is illustrative:

1-(4-acetanilido - $\Delta^{1,3}$-butadienyl) - benzothiazole ethiodide can be prepared by refluxing, for about one hour, 30.5 g. (1 mol.) of 1-methylbenzothiazole ethiodide and 25.9 g. (1 mol.) of $\beta$-anilinoacrolein anil hydrochloride in about 250 cc. of acetic anhydride. The 1-(4-acetanilido) compound separated from the chilled reaction mixture. It was filtered, washed with acetone and dried.

2-(4-acetanilido-$\Delta^{1,3}$-butadienyl)-quinoline ethiodide can be prepared by refluxing, for about one hour, 3 g. (1 mol.) of quinaldine ethiodide and 2.5 g. (1 mol.) of $\beta$-anilinoacrolein anil hydrochloride in about 20 cc. of acetic anhydride. The reaction mixture was chilled and the acetanilido compound precipitated by adding two volumes (about 40 cc.) of diethyl ether. The acetanilido compound was washed with water and acetone.

1-(4-acetanilido - $\Delta^{1,3}$-butadienyl)-benzoxazole ethiodide can be prepared by refluxing, for about one hour, 2.9 g. (1 mol.) of 1-methylbenzoxazole ethiodide and 2.5 g. (1 mol.) of $\beta$-anilinoacrolein anil hydrochloride in about 20 cc. of acetic anhydride. The reaction mixture was chilled and the acetanilido compound precipitated with two volumes (about 40 cc.) of diethyl ether. The tarry precipitate was stirred with acetone until crystalline.

In preparing either the anilinovinyl or the anilino-butadienyl compounds the cyclammonium quaternary salt employed is advantageously the alkiodides, though other quaternary salts can be employed, e. g. p-toluenesulfonates or alkyl sulfates.

The pyrazolones employed in preparing my new dyes can be prepared by first reacting the appropriate chloro heterocyclic base (for example 1-chlorobenzothiazole, 2-chlorothiazole of 1-chlorobenzoxazole) with hydrazine hydrate, employing at least a 50% excess of hydrazine. The hydrazine reaction goes readily upon warming. The resulting reaction mixture (advantageously basified with sodium hydroxide) can then be subjected to fractional distillation under vacuum to obtain the heterocyclo hydrazine. From the heterocyclo hydrazine, the pyrazolones can then be prepared as illustrated for 1-(1-benzothiazyl)-3-methyl-5-pyrazolone:

127 g. (0.77 mol.) of 1-benzothiazylhydrazine was dissolved in 200 cc. of warm glacial acetic acid and 103 g. (0.79 mol.) of ethyl acetoacetate was added. The whole was heated on the steam bath for a few minutes when the pyrazolone began to precipitate. Heating was continued for an hour when the reaction mixture had set to a solid mass. The solid pyrazolone was washed with boiling ethyl alcohol and obtained as a solid, melting at 226° to 227° C.

The so-prepared 5-pyrazolones can be converted into the corresponding 5-thiopyrazolones by treating with phosphorus pentasulfide in xylene or other appropriate solvent. See Ann. Vol. 361, page 261.

The chloro heterocyclic bases employed in preparing the pyrazolones can be prepared by known methods, such as are described for 1-chlorobenzothiazole by Hofmann in Ber. 12, 1126 (1879) and 13, 9 (1880); for 1-chlorobenzoxazole by Seidel in J. prakt. chem. (2) 42, 454 (1890) and by McCoy in Am. Chem. J., 21, 113–123 (1899); for 1-chloro-α-naphthothiazole by Hunter & Jones in the J. Chem. Soc., 941 (1930) and for 2-chlorothiazole by Schatzmann in Ann., 261, 10 (1891).

I have also found that merocyanine dyes can be prepared from 1-alkyloxindoles and 1-alkyl-2-thio-oxindoles. These dyes sensitize photographic emulsions, particularly gelatino-silver-chloride and bromide emulsions, for the blue and blue-green regions of the spectrum, in a novel and useful manner. The following examples serve to illustrate the preparation of these dyes.

EXAMPLE 6.—3 - [(2-ethyl-1(2)-benzoxazylidene) ethylidene]-1-methyloxindole 2.25 g. (1 mol.) of 1-(β-acetanilidovinyl)-benzoxazole ethiodide and 0.75 g. (1 mol.) of 1-methyloxindole were refluxed in about 10 cc. of absolute ethyl alcohol containing 0.5 g. (1 mol.) of triethylamine for about 30 minutes. The dye separated from the chilled reaction mixture. It was recrystallized from methyl alcohol and obtained as a mat of minute orange-yellow crystals, melting at 218° to 220° C. with decomposition. Its methyl alcoholic solution was yellow.

EXAMPLE 7.—3-[(2-ethyl-1(2)-benzothiazylidene) ethylidene]-1-methyloxindole 2.25 g. (1 mol.) of 1-(β-acetanilidovinyl)-benzothiazole ethiodide and 0.75 g. of 1-methyloxindole were refluxed in about 10 cc. of absolute ethyl alcohol containing 0.5 g. (1 mol.) of triethylamine for about 30 minutes. The dye separated from the cooled reaction mixture. It was twice recrystallized from methyl alcohol and obtained as reddish crystals having a metallic reflex and melting at 237° to 238° C. with decomposition. Its methyl alcoholic solution was golden yellow.

EXAMPLE 8.—1-ethyl-3-[(1-ethyl-2(1)-β-naphthothiazylidene) ethylidene]-2-thio-oxindole 2.5 g. (1 mol.) of 2-(β-acetanilidovinyl)-β-naphthothiazole ethiodide and 0.9 g. (1 mol.) of 1-ethylthio-oxindole were refluxed in about 25 cc. of absolute ethyl alcohol containing 0.5 g. (1 mol.) of triethylamine for about 30 minutes. The dye separated from the cooled reaction mixture. It was twice recrystallized from a mixture of pyridine and methyl alcohol and obtained as dark bronze crystals, melting at 279° to 281° C. with decomposition. Its methyl alcohol-pyridine solution was purple.

EXAMPLE 9.—1-ethyl-3-[(2-ethyl-1(2)-benzoxazylidene) ethylidene] 2-thio-oxindole 2.25 g. (1 mol.) of 1-(β-acetanilidovinyl)-benzoxazole ethiodide and 0.9 g. of 1-ethylthio-oxindole were refluxed in about 10 cc. of absolute ethyl alcohol containing 0.5 g. (1 mol.) of triethylamine for about 30 minutes. The dye separated from the cooled reaction mixture and was twice recrystallized from methyl alcohol. It was obtained as reddish needles, melting at 230° to 232° C. with decomposition. Its methyl alcoholic solution was pink.

EXAMPLE 10.—1-ethyl-3-[(2-ethyl-1(2)-benzothiazylidene) ethylidene]-2-thio-oxindole 2.25 g. (1 mol. of 1-(β-acetanilidovinyl)-benzothiazole ethiodide and 0.9 g. (1 mol.) of 1-ethylthio-oxindole were refluxed in about 10 cc. of absolute ethyl alcohol containing 0.5 g. (1 mol.) of triethylamine for about 30 minutes. The dye separated from the chilled reaction mixture. It was twice recrystallized from glacial acetic acid and obtained as dark greenish crystals, melting at 251° to 253° C. with decomposition. Its acetic acid solution was bluish red.

EXAMPLE 11.—1-ethyl-3-[(2-ethyl-1(2)-benzoxazylidene) ethylidene] oxindole 2.25 g. (1 mol.) of 1-(β-acetanilidovinyl)-benzoxazole ethiodide and 0.8 g. (1 mol.) of 1-ethyloxindole were refluxed in about 10 cc. of absolute ethyl alcohol containing 0.5 g. (1 mol.) of triethylamine for about 30 minutes. The dye separated from the chilled reaction mixture. It was twice recrystallized from methyl alcohol and obtained as orange flaky crystals, melting at 196° to 198° C. with decomposition. Its methyl alcoholic solution was yellow.

EXAMPLE 12.—1-ethyl-3-[(2-ethyl-1(2)-benzothiazylidene) ethylidene] oxindole 2.25 g. (1 mol.) of 1-β-acetanilidovinyl)-benzothiazole and 0.8 g. (1 mol.) of 1-ethyloxindole were refluxed in about 10 cc. of absolute ethyl alcohol containing 0.5 g. (1 mol.) of triethylamine for about 30 minutes. The dye separated from the chilled reaction mixture. It was twice recrystallized from methyl alcohol and obtained as dark blue crystals, melting at 196° to 198° C. with decomposition. Its methyl alcoholic solution was orange-yellow.

As in the case of the pyrazolones above, the 1-alkyl-oxindoles and 1-alkyl-2-thio-oxindoles can also be reacted with cyclammonium quaternary salts containing a substituted-mercapto or an ω-anilino-Δ$^{1,3}$-butadienyl group in a reactive position to give merocyanine dyes.

My new dyes, particularly those containing a 1-(1-benzothiazyl)-3-alkyl-5-pyrazolone nucleus, sensitize photographic emulsions in a novel and useful manner. My invention is particularly directed to the customarily employed silver halide, especially the silver chloride and bromide emulsions, which can contain other salts which may be light-sensitive. My invention is further particularly directed to the customarily employed gelatin emulsion. However, the gelatin can be replaced with any other carrier which has substantially no deleterious effect on the light-sensitive materials, e. g. a cellulose derivative or a resin.

In the preparation of photographic emulsions sensitized with my new dyes, it is only necessary to thoroughly disperse a small amount of my dyes in an ordinary photographic emulsion. The suitable and most economical concentration for any given emulsion will be apparent to those skilled in the art, upon making the ordinary tests and observations customarily used in the art of emulsion making. To prepare a gelatino-silver-halide emulsion the following procedure is satisfactory: A quantity of the dye is dissolved in a suitable solvent, for example methyl alcohol, acetone or pyridine, and a volume of this solution (which may be diluted with water) containing from 5 to 100 mg. of dye is slowly added to about 1000 cc. of an ordinary flowable gelatino-silver-halide emulsion with stirring. The dye is thoroughly incorporated. With the more powerful of my new sensitizing dyes, 10 to 20 mg. of dye per 1000 cc. of emulsion will suffice to produce maximum sensitizing effects with the ordinary gelatino-silver-halide emulsions.

The above statements are only illustrative and are not to be understood as limiting my invention in any sense, as it will be apparent that these dyes can be incorporated by other methods in many of the photographic emulsions customarily employed in the art, such, for instance, as by bathing a plate or film, upon which an emulsion has been coated, in a solution of the dye in an appropriate solvent, although such a method is ordinarily not to be preferred. The claims are intended to cover any combination of these new dyes with a photographic emulsion whereby the dye exerts a sensitizing effect upon the emulsion as well as a photographic element comprising a support, ordinarily transparent, upon which the light-sensitive emulsion is coated or spread and permitted to set or dry.

The accompanying drawing is by way of illustration. Each figure is a diagrammatic reproduction of a spectrogram showing the sensitivity of an ordinary gelatino-silver-bromide emulsion containing one of my new dyes. In Fig. 1, the curve represents the sensitivity of an ordinary gelatino-silver-chloride emulsion containing 1-(1-benzothiazyl)-4-[(2-e t h y 1-1(2)-benzothiazylidene) ethylidene]-3-methyl-5-pyrazolone. In Fig. 2, the curve represents an ordinary gelatino-silver-bromide emulsion containing 1-(1-benzothiazyl) 4-[(2 - ethyl - 1(2) -benzoselenazylidene) ethylidene]-3-methyl-5-pyrazolone. In Fig. 3, the curve represents the sensitivity of an ordinary gelatino-silver-bromide emulsion containing 1-(1-benzothiazyl)-4-[(1-ethyl-2(1)-quinolylidene) ethylidene]-3-methyl-5-pyrazolone. In Fig. 4, the curve represents the sensitivity of an ordinary gelatino-silver-bromide emulsion containing 1-(1-benzothiazyl)-4-[(2-ethyl-1(2)-β-naphthothiazylidene) ethylidene]-3-methyl-5-pyrazolone.

Still further examples of emulsions could be given, but the foregoing will serve to teach those skilled in the art the principles of sensitizing emulsions with my new dyes. The illustrations have been confined largely to the dyes where $n$ represents two since it is this group of dyes which is of the greatest utility in sensitizing emulsions, particularly for the blue and blue-green regions of the spectrum.

My new dyes, particularly those where $n$ represents one or two, can be employed in preparing light filters and in coloring textiles, such as textiles made from cellulose acetate yarn.

My new dyes can probably exist in two forms, illustrated as:

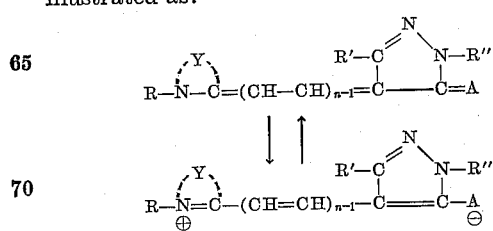

What I claim as my invention and desire to be secured by Letters Patent of the United States of America is:

1. A dye selected from the group of dyes characterized by the following formula:

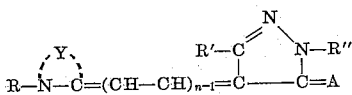

and

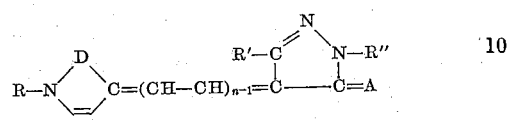

wherein A represents an atom selected from the group consisting of oxygen and sulfur, D represents a group selected from the group consisting of vinylene and phenylene groups, $n$ represents a positive integer not greater than three, R and R' represent alkyl groups, R'' represents a heterocyclic group selected from the group consisting of α-thiazyl, α-selenazyl, and α-oxazyl groups and Y represents the non-metallic atoms necessary to complete a heterocyclic nucleus selected from the group consisting of five-membered and six-membered heterocyclic nuclei.

2. A dye of the following formula:

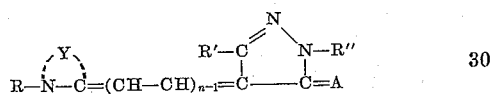

wherein A represents a divalent atom selected from the group consisting of oxygen and sulfur, $n$ represents a positive integer not greater than three, R and R' represent alkyl groups, R'' represents a heterocyclic group selected from the group consisting of α-thiazyl, α-selenazyl, and α-oxazyl groups and Y represents the non-metallic atoms necessary to complete a five-membered heterocyclic nucleus.

3. A dye of the following formula:

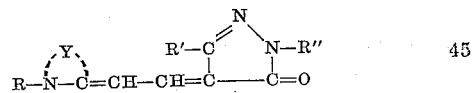

wherein R and R' represent alkyl groups, R'' represents a heterocyclic group selected from the group consisting of α-thiazyl, α-selenazyl and α-oxazyl groups and Y represents the non-metallic atoms necessary to complete a five-membered heterocyclic nucleus.

4. A dye of the following formula:

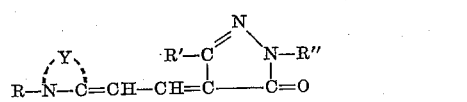

wherein R and R' represent alkyl groups, R'' represents an α-benzothiazyl group and Y represents the non-metallic atoms necessary to complete a benzothiazole nucleus.

5. A dye of the following formula:

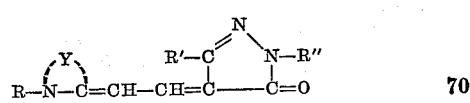

wherein R and R' represent alkyl groups, R'' represents an α-benzothiazyl group and Y represents the non-metallic atoms necessary to complete a benzoxazole nucleus.

6. A dye of the following formula:
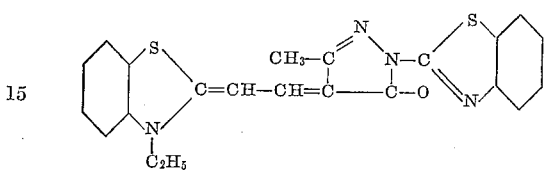
wherein R and R' represent alkyl groups, R'' represents an α-benzothiazyl group and Y represents the non-metallic atoms necessary to complete a benzoselenazole nucleus.
7. A dye of the following formula:
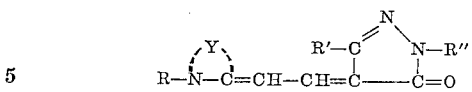
8. A dye of the following formula:
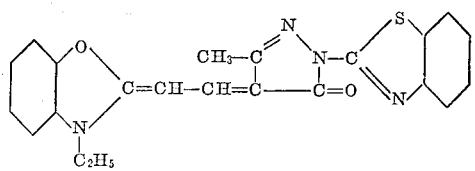
9. A dye of the following formula:
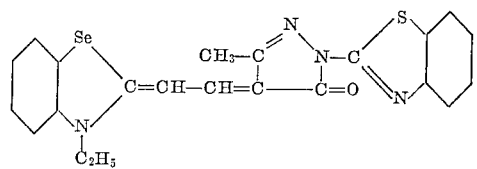
LESLIE G. S. BROOKER.